June 30, 1925.                H. W. RICKS                1,544,182
GRAPHIC CHART
Filed Sept. 19, 1923
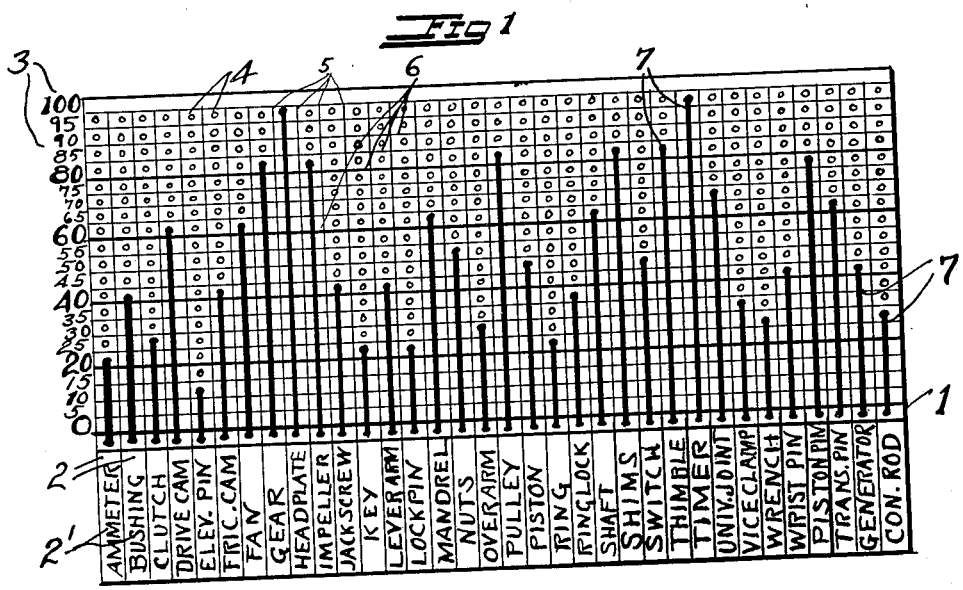
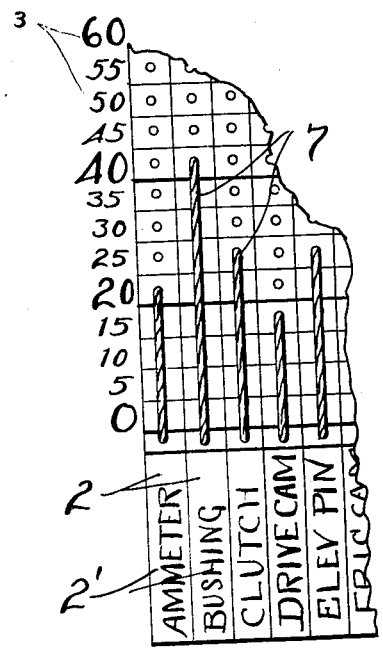
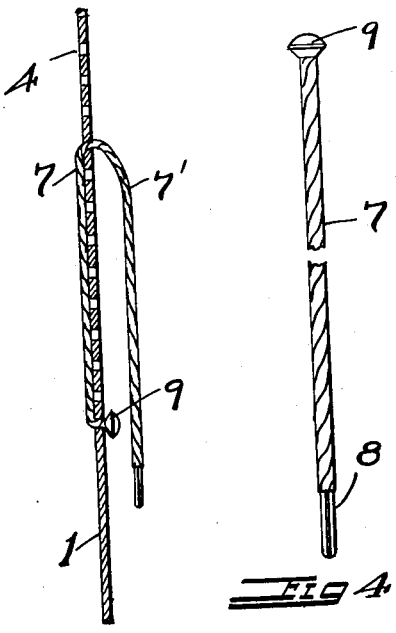
INVENTOR
H.W. Ricks
BY
ATTORNEY Patented June 30, 1925.

1,544,182

UNITED STATES PATENT OFFICE.

HARRY W. RICKS, OF LOS ANGELES, CALIFORNIA.

GRAPHIC CHART.

Application filed September 19, 1923. Serial No. 663,666.

*To all whom it may concern:*

Be it known that I, HARRY W. RICKS, a citizen of the United States, and a resident of Los Angeles, county of Los Angeles, State of California, have invented a new and useful Graphic Chart, of which the following is a specification.

My invention relates to graphic charts which are used to visibly denote the relation of one series of things to another series and which chart is provided with means for changing it in conformity with any change in the relation.

Its particular object is to provide such a chart of simple and inexpensive construction, and one which is adaptable to use in various industries wherein a chart record of operations, materials, stock, etc., is kept.

To carry out my invention I employ the elements shown in the drawings and in which Figure 1 shows a complete chart with columns of tabulated data and extensible lines opposite the items in one column.

Figure 2 is an enlarged portion of a corner of the chart. Figure 3, a section of Figure 2 taken along the line 3—3 and Figure 4 a full size detail of one of the lace lines.

With further reference to the figures it will be seen that my chart consists of a card, board, or tablet (1), which may be of any shape but is here shown as a rectangle, and on it is arranged a series of data spaces (2) here shown with illustrative data (2') inserted, and another series of data (3) extending at right angles to the first series.

Holes (4) are punched over the entire surface of the chart forming rows extending away from all data items.

Extending from one series of data are indicating lines (5) to show the relation between items in the two series of data.

The chart is also marked with alining rules (5 and 6) of various intensities so that the relation of the various spaces to denote data may easily be observed by following the ruling.

The indicating lines (7) of my chart all begin in a row adjacent one column of data and are extensible away from the point of beginning. To achieve this I form them out of pieces of string, or lace—preferably colored—one for each row of holes or data item in one of the columns.

These laces are threaded through the holes in a manner to exhibit from the face of the chart a row of solid lines, of a length depending on which holes the ends of the laces are inserted.

Figure 2, the enlarged fragment of the chart, shows clearly the appearance of lines formed as described, and Figure 3 the sectional relation of the lace (7) and chart (1) and wherein the free end of the lace 7' is shown hanging behind the chart and concealed thereby.

On the free end of the lace I provide a metal or other point (8) for threading it through the holes, and on the other end a stop (9) which may be a knot but for the purpose of providing a finished commercial article is preferably a small metal ball.

Figure 4 shows the construction of my lace as described.

I am aware of earlier charts of this character but am not aware of any presenting a row of solid lines in alinement with a row of data items with the lines adjustable over a ruled chart surface as described.

I claim:

1. A chart of the character described having on its face columns of tabulated data with holes in the face of the chart forming a separate row in line with each data item and extending therefrom and a lace extending over a row of the holes forming a graphic line thereover with the free ends of the lace passed through separate holes and both concealed back of the chart and whereby the line terminates at the respective holes.

2. A chart of the character described having on its face columns of tabulated data with holes in the face of the chart forming a separate row in line with each data item and extending therefrom and a lace threaded through one of the holes extending along the face of the chart and back again through another hole whereby the lace forms a line on the chart terminating at the respective holes with both ends of the lace concealed back of the chart and the lace having a threading tip secured to one end for threading through the holes and a stop on the other end adapted to engage the back of the chart.

HARRY W. RICKS.